United States Patent

[11] 3,634,673

| [72] | Inventor | John R. Grindon<br>St. Louis County, Mo. |
|---|---|---|
| [21] | Appl. No. | 859,822 |
| [22] | Filed | Sept. 22, 1969 |
| [45] | Patented | Jan. 11, 1972 |
| [73] | Assignee | McDonnell Douglas Corporation<br>St. Louis, Mo. |

[54] RADIO DIRECTION FINDER SIGNAL PROCESSING MEANS
12 Claims, 4 Drawing Figs.

[52] U.S. Cl.................................................. 235/194,
235/186, 235/198, 328/133
[51] Int. Cl...................................................... G06g 7/16,
G06g 7/22
[50] Field of Search............................................ 235/184,
186, 189, 191, 193–194, 198; 328/13, 24, 133;
332/31, 40–42; 324/83, 86, 107; 307/232, 264,
295, 127

[56] References Cited
UNITED STATES PATENTS

| 2,976,363 | 3/1961 | Barton................... | 332/40 X |
| 3,013,724 | 12/1961 | Thompson et al.............. | 235/194 |
| 3,057,555 | 10/1962 | Case, Jr........................ | 235/194 X |
| 3,068,467 | 12/1962 | Grimaila....................... | 235/189 UX |
| 3,069,630 | 12/1962 | Adams et al.................. | 328/133 |
| 3,159,743 | 12/1964 | Brouillette, Jr. et al. ...... | 235/198 |
| 3,358,129 | 12/1967 | Schultz......................... | 235/194 |
| 3,430,855 | 3/1969 | Hartwell et al. .............. | 235/189 X |
| 3,475,626 | 10/1969 | Holzman et al............... | 235/186 X |
| 3,525,861 | 8/1970 | Alexander.................... | 235/194 X |

*Primary Examiner*—Malcolm A. Morrison
*Assistant Examiner*—Jerry Smith
*Attorney*—Charles B. Haverstock ABSTRACT: Apparatus for processing radio direction finding signals and the like including an electronic circuit including means for generating an output signal proportional to the amplitude of a first input signal times a function of the phase difference between two other input signals, and applications of the same. The apparatus also includes means for substantially reducing display azimuth bearing errors such as are caused by multipath reflection interference and the like.

RADIO DIRECTION FINDER SIGNAL PROCESSING MEANS

There are many devices in existence which are capable of multiplying two or more different types of signals such as those differing in phase and those having no phase, however, heretofore it has been difficult to perform such multiplications conveniently and accurately with analog means. The use of analog circuits can be a great advantage in some applications, especially when one of the functions to be multiplied contains its information in the form of a phase angle and another in the form of a voltage. Furthermore, with analog means the multiplication of such signals can be performed in a rather more direct manner and no complex interface equipment is required for converting the signals to digital form such as are needed when digital means are employed. The disadvantages of digital means and the prior less accurate analog means are overcome by the present invention which teaches the construction and operation of a novel electronic circuit which permits the linear multiplication of such signals over a wide range of signal levels, and which is much less complex and less expensive than the prior art devices previously utilized to accomplish the same or similar results.

The present analog circuit can be used in general computation applications to accomplish the above-described signal operations and it is comprised generally of amplitude modulator means and phase detector means. The amplitude modulator means employed are constructed to amplitude modulate a first periodic signal, for example $e_3$, a signal that can be represented by the general expression $E_3 f(\omega t + \phi_3)$ where $E_3$ is the signal's magnitude, $\omega$ is its frequency and $\phi_3$ is its phase angle at time zero, and combine this amplitude modulated signal with another signal for example $e_1$ so that the output of the modulator means is a function of the average magnitude of $e_1$, and the frequency and phase angle of $e_3$, which output can be expressed $g \{E_1 f(\omega t + \phi_3)\}$. This output is then fed to the phase detector means and its phase angle $\phi_3$ compared to the phase angle of a second periodic signal $e_2$ which for example can be represented as $E_2 h(\omega t + \phi_2)$, where $E_2$ is the magnitude of $e_2$, $\omega$ is its frequency and $\phi_2$ is its phase angle at time zero. The output of the phase detector is a signal that is a function of $E_1$ and the two compared phase angles, which can be expressed as $g' \{E_1 f'(\phi_3 - \phi_2)\}$. Alternatively, the circuit can be arranged so that the comparison of the phase angles of the periodic signals $e_3$ and $e_2$ is accomplished first in the phase detector means to produce an output $g'' \{E_3 f'(\phi_3 - \phi_2)\}$ which output is then amplitude modulated to remove the $E_3$ component and substitute therefor $E_1$ to arrive at the same end result, namely $g' \{E_1 f'(\phi_3 - \phi_2)\}$. The symbols $f, f', g, g', g''$ and $h$ in the above expressions indicate functions thereof.

Besides being useful for general computation applications, the subject circuit is also useful in devices or systems such as those described in the Perkinson et al. U.S. Pat. No. 3,369,239, issued Feb. 13, 1968, and Venters et al. U.S. Pat. No. 3,568,203, issued Mar. 2, 1971, both of which are assigned to Applicant's assignee. In these situations the subject circuit is used to convert target range and azimuth information which is contained in signals received at an antenna into signals that can be used to produce displays on a readout device such as a cathode-ray tube. In such applications it is important that the subject circuit be able to tolerate relatively large amplitude variations in the periodic signal inputs inasmuch as the signal strength may vary widely depending upon the location including the range of the aircraft or remote device. There are also many other possible uses and applications for the subject circuit and there are also many possible variations and modifications thereof which will be described and/or suggested in this specification.

It is therefore a principal object of the present invention to provide improved means for operating on and combining analog signals and parts thereof.

Another object of the present invention is to provide circuit means for producing a function proportional to the magnitude of a first signal and the phase difference between a second and a third signal.

Another object is to provide means capable of amplitude modulating periodic input signals that may vary in magnitude and wave shape without shifting the phase thereof.

Another object is to provide means capable of producing linear amplitude modulation even when the modulating signal approaches zero amplitude.

Another object is to provide phase detector means which can accurately produce outputs which are functions of the phase angle difference between two input signals which vary periodically but do not necessarily have the same wave shape.

Another object is to provide means for processing signals proportional to the range and azimuth of an object such as an airplane flying at some remote locations for application to a display device such as a cathode ray tube.

Another object is to provide means for extracting accurate information from phased signals which may have erroneous signal portions therein.

These and other objects and advantages of the present invention will become apparent after considering the following detailed specification which discloses several preferred embodiments thereof in conjunction with the accompanying drawings wherein:

FIG. 4 is a block diagram showing the present voltage phase function multiplier being employed in a device for processing range and direction information used in a device for visually displaying the range and location of a remote object such as a flying airplane or the like.

Figure 1:
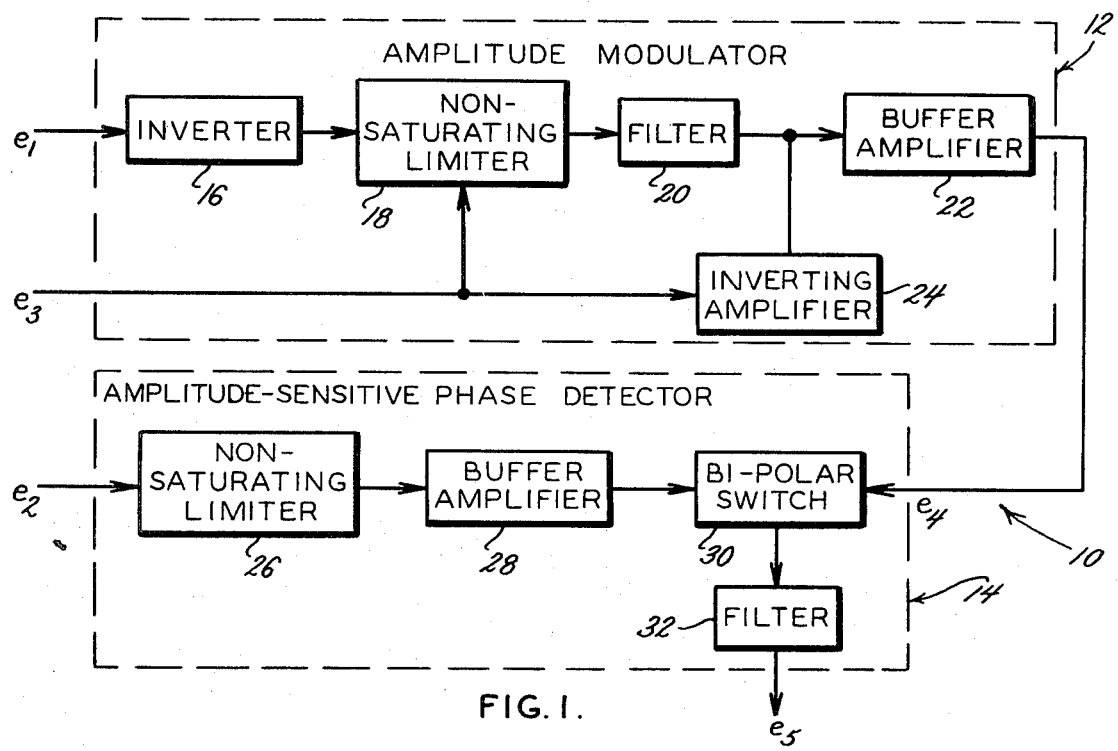
FIG. 1 is a block diagram of a representative voltage phase function multiplier circuit constructed according to the present invention.

Referring to the drawings more particularly by reference numbers, number 10 in FIG. 1 refers to the circuit of a voltage phase function multiplier constructed according to the present invention. The circuit 10 includes an amplitude modulator portion 12 and a phase detector portion 14. As shown the amplitude modulator portion 12 has two inputs identified as inputs $e_1$ and $e_3$, $e_1$ being any type of input signal but for the purposes of this disclosure and to simplify the understanding, $e_1$ will be treated as a DC signal. $e_3$ may be any type of periodically varying signal although for simplicity it is shown as a signal represented by a sinusoidal function with a phase angle $\phi_3$ and a frequency $\omega$.

$e_1$ is fed as an input to the amplitude modulator 12 and is first reversed in polarity by an optional inverter circuit 16 which may or may not be required depending upon the initial polarity of $e_1$ and the design of the remaining circuitry. The output of the inverter which is $-e_1$ is fed as a first input to a nonsaturating (or saturating) limiter 18 while the input $e_3$ is fed as a second input to the same limiter 18. The limiter circuit 18 produces an output signal in the form of a substantially square wave which has an amplitude proportional to $e_1$ and the frequency and phase characteristics of $e_3$. This square wave output is fed to a filter circuit 20 which passes only the fundamental sinusoidal frequency thereof to a buffer amplifier circuit 22. When $e_3$ is a sinusoidal signal the output of the filter 20 is a signal that is basically $e_3$ amplitude modulated by the DC signal $e_1$, with any initial amplitude modulation that may have been present on $e_3$ removed by the limiter 18.

The characteristics of transistors are usually relatively nonlinear when operated at zero or close to a zero bias level. Therefore, a small signal which is fundamentally $e_3$ is allowed to leak through the nonsaturating limiter 18 so that when $e_1$ is at or near zero, the limiter 18 is kept operating in its linear operating range by the leaking signal. The small signal error thereby created is then cancelled out by an equal amplitude but opposite phase signal which is produced by an inverting amplifier 24 that has an input connected to receive the $e_3$ input. The output of the inverter amplifier 24 is combined with the output of the filter 20 to compensate for the leakage of $e_3$ through the limiter 18 when $e_3$ is a sinusoidal signal. If $e_3$ has some other periodic wave shape, however, well-known techniques utilizing negative feedback may be required to compensate for the induced error but a somewhat more complex circuit results. The leakage of $e_3$ through the limiter 18 and then the correction of the induced error results in a modulation characteristic for the amplitude modulator 12 which is linear over a relatively wide range of amplitudes of the input $e_1$. This also causes the phase angle of the periodic input signal $e_3$ to be preserved over the full range of the modulating voltage $e_1$.

The output of the buffer amplifier 22 is a signal $e_4$ which can be expressed as $k_m e_1 \sin(\omega t + \phi_3)$, where $k_m$ is a constant introduced by the modulator means. The signal $e_4$ along with the input $e_2$ which can be expressed as $E_2 \sin(\omega t + \phi_2)$ are fed as the separate inputs to the phase detector 14 as shown in FIG. 1. The phase detector 14 processes the input signal $e_2$ by passing it through a nonsaturating limiter circuit 26 and a buffer amplifier circuit 28 to produce a substantially square wave output which has the same frequency and phase as the input $e_2$ but a constant amplitude.

The output from the buffer amplifier circuit 28 and the output $e_4$ from the buffer amplifier circuit 22 in the amplitude modulator 12 are fed as separate inputs to a bipolar switch 30 which is constructed to sense the point at which the output of the buffer amplifier 28 crosses a predetermined voltage level. When the output is going generally positive at the crossover, the switch 30 closes and allows the signal $e_4$ to appear at its output. When the output of the buffer amplifier 28 crosses the said predetermined voltage when going generally negative the switch 30 opens and the output therefrom will be zero. The switch outputs can therefore be expressed as $k_m e_1 \sin(\omega t + \phi_3)$ when $0 < (\omega t + \phi_2) < \pi$ radians and zero when $\pi < (\omega t + \phi_2) < 2\pi$ radians. The outputs of the bipolar switch 30 are fed as inputs to an averaging filter circuit 32 or integrator circuit which operates to cutoff all frequencies equal to or greater than $\omega$ and passes signals that represent the average value of the switch outputs. The output $e_5$ of the filter 32 can be expressed by the equation:

$$e_5 = \frac{1}{\pi} \int_0^\pi k_m e_1 \sin(\omega t + \phi_3) d(\omega t + \phi_2) + \frac{1}{\pi} \int_\pi^{2\pi} (o) d(\omega t + \phi_2)$$

which reduces to $$e_5 = \frac{2 k_m e_1}{\pi} \cos(\phi_3 - \phi_2)$$

The output $e_5$ of the phase detector 14 is the desired result since it represents, as can be seen, a multiplication of the cosine of the phase angle difference $(\phi_3 - \phi_2)$ between the inputs $e_2$ and $e_3$ and the amplitude of the input $e_1$ which it will be recalled may be a DC signal. To produce $e_1$ multiplied by the sine of the phase difference $(\phi_3 - \phi_2)$, $e_3$ or $e_2$ is simply 90° phase shifted before it is fed to the device 10.

The signal $e_4$ in the generalized situation need not always be a sinusoidal signal and for this reason the filter circuit 20 in the amplitude modulator 12 may be eliminated, if desired. For example, if $e_4$ is a square wave then the output of the switch 30 will be a piecewise linear or triangular function of phase difference between the signals $e_2$ and $e_4$, said function having a straight line positive slope from $-\pi$ radians to zero, and a straight line negative slope from zero to $\pi$ radians.

Figure 2:
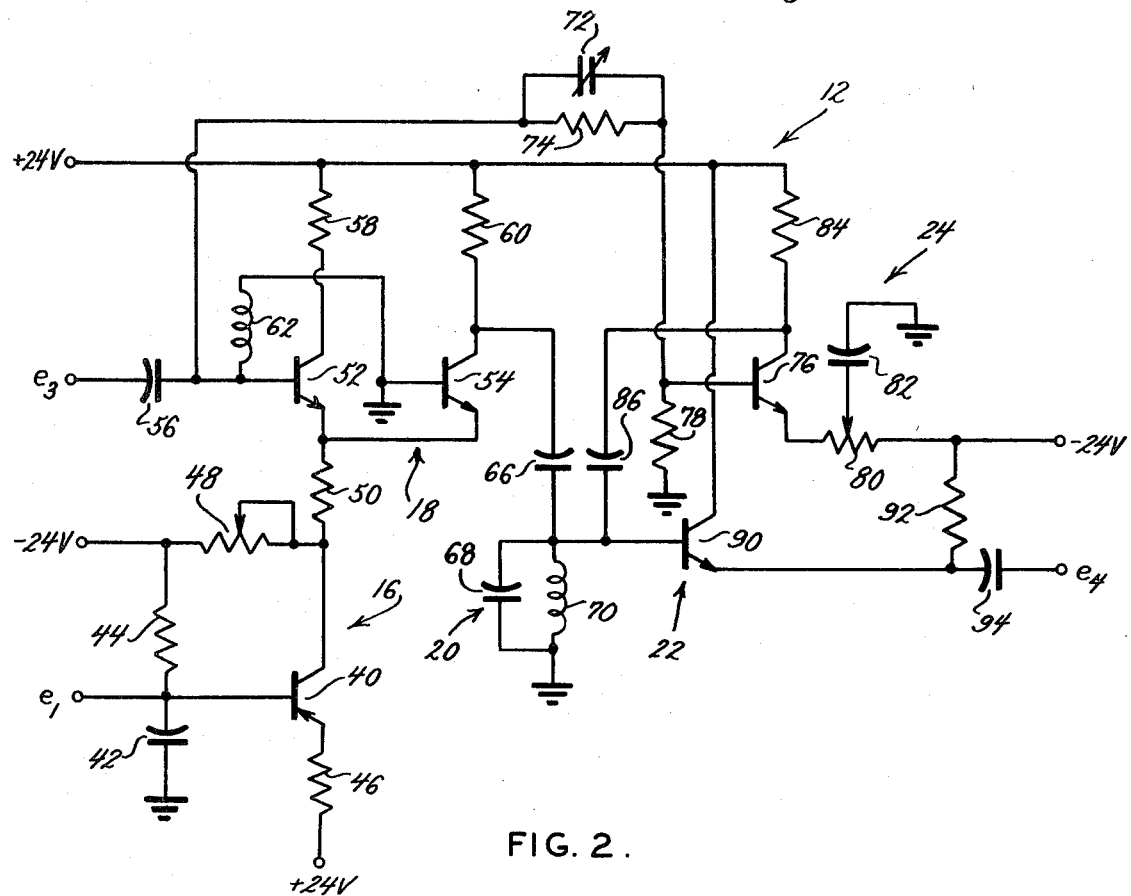
FIG. 2 is a schematic circuit diagram of an amplitude modulator for use in the circuit of FIG. 1.

FIG. 2 is a schematic diagram of the amplitude modulator 12 of FIG. 1. In this circuit it can be seen that $e_1$ is applied to the base of a transistor 40 which is part of the inverter circuit 16. The base of the transistor 40 is also connected to ground through an optional capacitor 42 which operates to ground any high frequency components that may be present in the input $e_1$. The base of the transistor 40 is also negatively biased by a connection to a negative potential source through a resistor 44. The emitter of the transistor 40 is connected through another resistor 46 which is a load resistor to a positive potential source. The collector of transistor 40 is connected to the same negative potential source as the base through a potentiometer 48 which can be adjusted to vary the output of the inverter 16. The output of the inverter 16 is a negative signal that is proportional to the amplitude of the input $e_1$, and this signal is fed through a resistor 50 to the nonsaturating limiter circuit 18 which includes two transistors 52 and 54 connected as shown. The negative output signals from the inverter 16 are fed to the emitters of both transistors 52 and 54, while the input signal $e_3$ is fed to the base of transistor 52 through a coupling capacitor 56. The transistors 52 and 54 have their collectors connected to a positive potential source through associated load resistors 58 and 60 respectively and the base of the transistor 52 is grounded through a coil 62 which provides a low impedance DC path to ground for the base but a high impedance to ground for AC thereby blocking or preventing the passage to ground of the $e_3$ signal except low frequency components thereof. The base of the transistor 54 is connected directly to ground.

When the input $e_3$ is sufficiently positive, the emitter voltage of the transistor 52 will be raised high enough to prevent the transistor 54 from conducting and therefore no current will flow in the collector load resistor 60. However, at this time current will flow through the load resistor 58 because the transistor 52 will be in a conducting condition. When, on the other hand, the input $e_3$ goes sufficiently negative, the transistor 52 will cease conducting and the transistor 54 will carry the full inverter output which output passes through load resistor 60. The voltage across the load resistor 60 therefore is a square wave whose amplitude is controlled by the output received from the inverter 16, which is proportional to $e_1$, and whose frequency and phase are equal to that of $e_3$. This square wave voltage is fed as an output from the collector of transistor 54 through a coupling capacitor 66 to the filter circuit 20 which includes parallel connected capacitor 68 and coil 70 the opposite sides of which are grounded. The filter circuit 20 is tuned to select and pass only the sine wave fundamental of the limiter square wave output and to ground the higher frequency components thereof, and the outputs of the filter circuit 20 are fed to the buffer amplifier circuit 22.

The input signal $e_3$ is also fed to the inverting amplifier 24, however $e_3$ is first passed through an adjustable phase shifting network that includes parallel connected variable capacitor 72 and resistor 74 to allow adjustment for variations in phase which may occur during the inversion step. $e_3$ after passing through the phase shifting network is then fed to the base of a transistor 76 which is also connected to ground through resistor 78. The emitter of the transistor 76 is connected to the negative potential source through a potentiometer 80 whose wiper arm is connected to ground through a bypass capacitor 82. The capacitor 82 operates as a closed circuit to AC and as an open circuit to DC. Adjustment of the positions of the wiper arm of potentiometer 80 therefore varies the AC gain of the transistor 76 and provides an adjustment for the amplitude of its output which appears across a load resistor 84 connected between the collector of the transistor 76 and a positive potential source. Another coupling capacitor 86 connects the output signal of the transistor 76, which normally has the same phase and frequency as the output of the filter 20 but with reversed polarity and reduced amplitude, to the base of another transistor 90 which is in the buffer amplifier 22 and is provided for leakage error compensation as aforesaid.

The collector of the transistor 90 is connected to the positive potential source and the emitter thereof is connected to the negative potential source through a load resistor 92. The output $e_4$ of the buffer amplifier 22 appears as a voltage across resistor 92 and is represented by the expression $k_m e_1 \sin(\omega t + \phi_3)$ as aforesaid. The output of the buffer amplifier 22 may also include a coupling capacitor 94 to isolate the DC voltages of the amplitude modulator 12 from connected components, such as from the phase detector 14 shown in FIG. 1.

Figure 3:
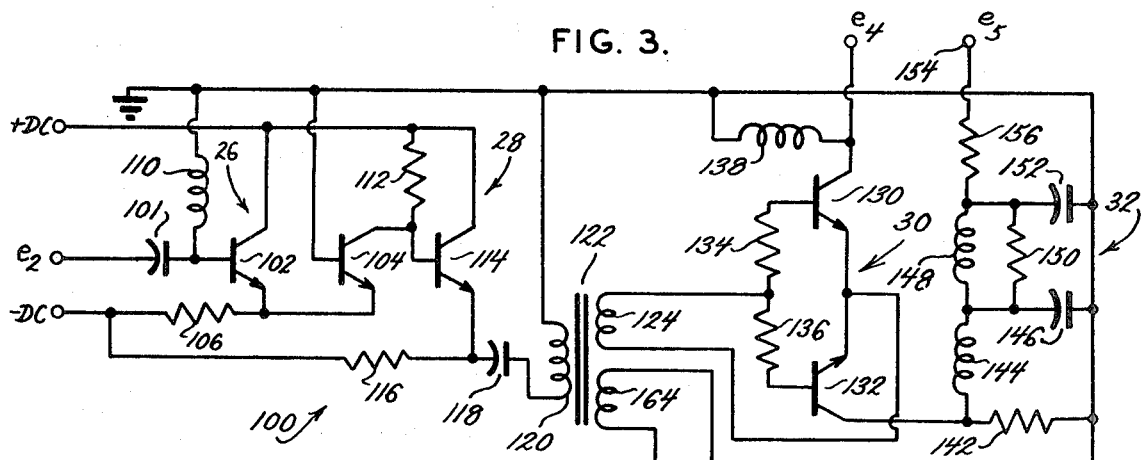
FIG. 3 is a schematic circuit diagram of an amplitude sensitive phase detector for use in the circuit of FIG. 1.

FIG. 3 is a schematic of a phase detector 100 similar to that shown in FIG. 1. The phase detector 100 is fed inputs $e_2$ which can be represented by the expression $E_2 \sin(\omega t + \phi_2)$, and $e_4$ as described above. The input $e_2$ is fed to the nonsaturating limiter 26 through a coupling capacitor 101 which isolates the DC potential of the phase detector 100 from the $e_2$ signal producing means. The nonsaturating (or saturating) limiter 26 includes two transistors 102 and 104 whose emitters are connected in common and to the negative potential source through a resistor 106. The base of the transistor 102 is connected to ground through a coil 110 which provides a DC path to ground but acts as a high blocking impedance to the signal $e_2$. The base of transistor 104 is directly grounded. When the input $e_2$ is sufficiently positive the emitter voltage of the transistor 102 will be raised high enough to cause the transistor 104 to cease conducting. When the input $e_2$ is sufficiently negative, however, the transistor 102 ceases to conduct and the transistor 104 carries the full-emitter current thus causing a greater potential difference across the load resistor 112. The signal which appears across the resistor 112 is therefore a square wave which is fed to the base of another transistor 114 that is located in the buffer amplifier 28. The collector of the transistor 114 is connected to the positive potential source while its emitter is connected through another load resistor 116 to the negative potential source. The output of the buffer amplifier 28 appears as a square wave signal across its load resistor 116, and this signal is coupled through a coupling capacitor 118 to and through a primary winding 120 of a transformer 122, the opposite side of which is connected to ground. A secondary winding 124 of the transformer 122 feeds the square wave signal from the buffer amplifier 28 to the bipolar switch 30 in the form of a series of pulses.

The bipolar switch 30 includes transistors 130 and 132 whose emitters are connected together and to one side of the secondary transformer winding 124 and whose bases are connected together through resistors 134 and 136, respectively, to the other side of the transformer secondary 124. DC voltages that may be present on the collector of the transistor 130 are grounded through another coil 138. When the transformer 122 applies a positive potential pulse to the bases of the transistors 130 and 132 both transistors conduct placing the switch 30 in an "on" condition, and conversely when the transformer 122 applies a negative potential pulse to the bases of the transistors 130 and 132 they both cease conducting placing the switch 30 in its "off" condition. This switching action takes place in phase with $e_2$. Therefore, the bipolar switch is closed when $(\omega t + \phi_2)$ is greater than zero and less than $\pi$ radians and open when $(\omega t + \phi_2)$ is greater then $\pi$ but less than $2\pi$ radians.

The second or $e_4$ input to the phase detector 100 is connected to the collector of the switching transistor 130 and is passed through the switch 30 whenever the switch is closed and is blocked whenever the switch is open. The output of the bipolar switch 30 appears on the collector of the transistor 132 and is fed to the averaging filter circuit 32.

The output current of the transistor 132 of the bipolar switch 30 appears as a signal across a resistor 142 which is connected between the collector of the transistor 132 and ground. The output of the switch 30 is also connected to the averaging filter 32 through a coil 144 which has its opposite side connected to ground through a capacitor 146 and through parallel circuitry including another coil 148, a resistor 150, and a capacitor 152 connected as shown. The output of the switch circuit 30 is also connected to an output terminal 154 through the coils 144 and 148 in series and also through another series connected resistor 156. The terminal 154 is the output terminal of the phase detector 100.

The averaging filter circuit 32 converts the outputs it receives from the bipolar switch 30 which for the circuit as disclosed consist of sections of sine waves into an output $e_5$ which can be represented by the expression $(-2k_m e_1)/(\pi) \cos(\phi_3 - \phi_2)$. This expression is a function of $e_1$ multiplied by a function of the phase difference between the input signals $e_3$ and $e_2$ as desired. Referring again to FIG. 3, it can be seen that the circuit as shown includes a second bipolar switch 160 and a second filter circuit 162. The circuits 160 and 162 are similar respectively to the circuits 30 and 32 and are connected to receive their inputs from a second secondary winding 164 of the transformer 122 which is wound to have a similar polarity to that of the secondary winding 124. When another signal $e_4'$, which can be represented as $e_1 k_m \cos(\omega t + \phi_3)$ which is obtainable from a second amplitude modulator similar to amplitude modulator 12 having inputs $e_1$ and $e_3 + 90°$ is applied to the input terminal 166 of the second bipolar switch 160, the output from the filter 162 becomes a function of $e_1$ multiplied by the sine of the difference between the phase angles $\phi_3$ and $\phi_2$. Therefore, when the outputs on the output terminals 154 and 168 respectively of circuits 32 and 162 are applied respectively to horizontal and vertical plates of a cathode-ray tube (not shown in FIG. 3), after suitable amplification and/or storage, the tube will display the results of the above voltage phase function multiplications. Such displayed information is especially useful in certain cases such for example as when $e_1$ represents the range of an object such as the range of an airplane from a ground station, and the phase difference between $e_3$ and $e_2$ represents the azimuth angle or the direction of the object from the ground station. When these signals are applied to the cathode-ray tube, the tube will show the actual location of the object or objects thereon. The usefulness of such a display or plot for air traffic control and monitoring purposes as well as in other applications including tracking of air and space vehicles and in collision avoidance applications is obvious.

Figure 4:
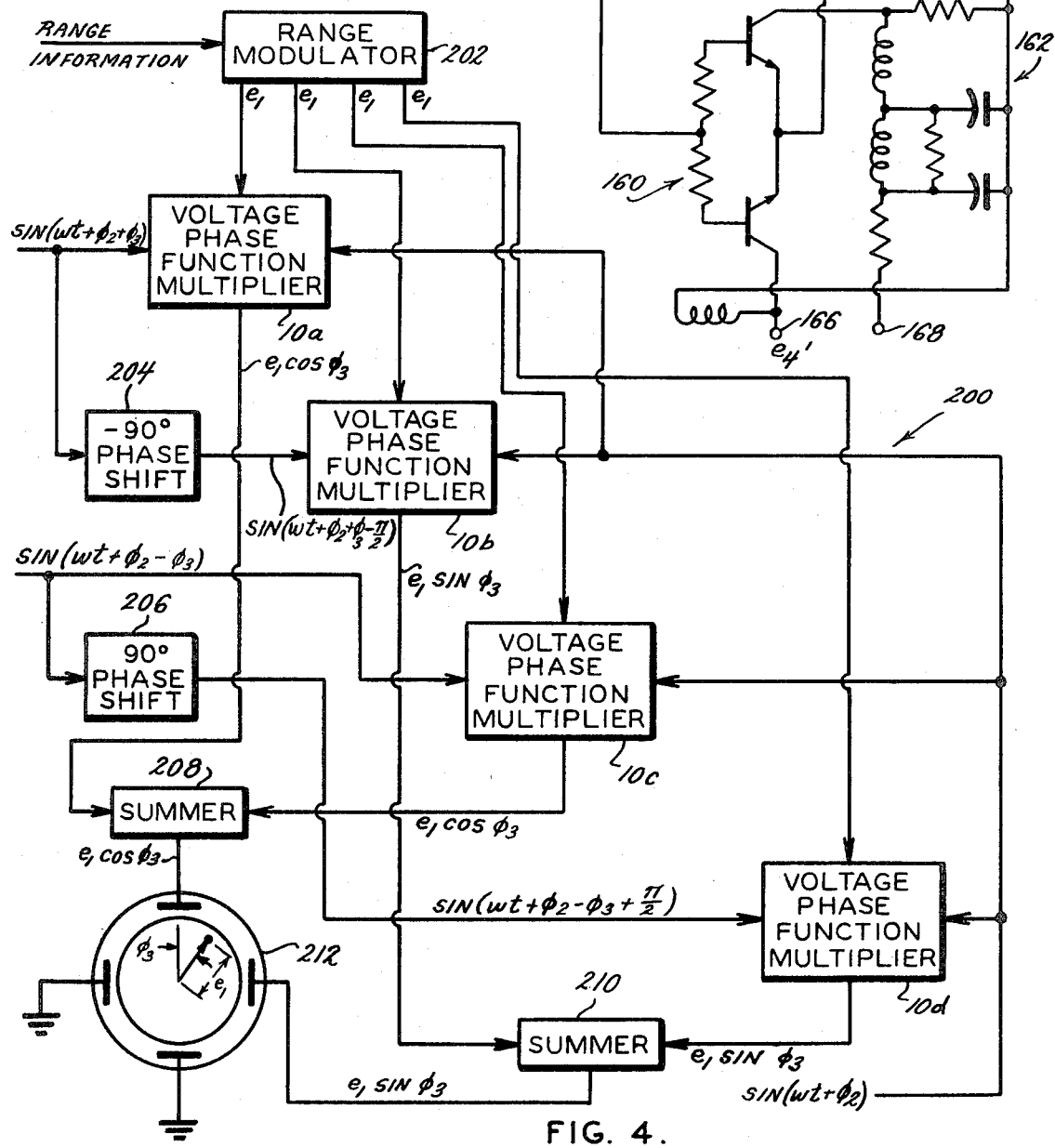

FIG. 4 shows another application of the subject voltage phase function multiplier means in a device 200 for displaying and/or plotting the range and azimuth or bearing of an object from signals such as are obtained from aircraft equipped with collision avoidance means such as disclosed in the aforementioned Perkinson et al. patent. In this and other applications it is desirable to minimize the effects of reflected and other erroneous signals that are received by the antenna. In this case, the range information is converted in a range modulator 202 to a voltage $e_1$ proportional to the range. When using the display generating device described in the above-mentioned Perkinson et al. patent only two of the three available azimuth information containing input signals as described in the Venters et al. application mentioned above, which application covers the antenna therefor, are used. The three signals can be represented in the absence of distortion respectively as $\sin(\omega t + \phi_2)$, $\sin(\omega t + \phi_2 + \phi_3)$, and $\sin(\omega t + \phi_2 - \phi_3)$ where $\phi_2$ and $\phi_3$ are phase angles and $\phi_3$ represents the azimuth angle or direction to the object in question. As can be seen in FIG. 4, all three azimuth information containing periodic signals are utilized, with $\sin(\omega t + \phi_2 \phi_3)$ and $\sin(\omega t + \phi_2 - \phi_3)$ each being fed to an associated phase shifter network 204 and 206, respectively. The phase shifters 204 and 206 shift the phase of the said signals by amounts equal to $(-\pi)/(2)$ and $(+\pi)/(2)$, radians, respectively, so that the two other signals represented as $\sin(\omega t + \phi_2 + \phi_3 - (\pi)/(2))$ and $\sin(\omega t + \phi_2 - \phi_3 + (\pi)/(2))$ respectively are synthesized.

The device 200 also is shown as having four voltage phase multipliers 10a, 10b, 10c and 10d which may be similar to those described above. Each of the voltage phase multipliers has an input connected to receive an output from the range modulator circuit 202. The function multipliers 10a thru 10d are also connected to each receive first and second periodic input signals (represented as $e_3$ and $e_2$, respectively in FIG. 1 as aforesaid) wherein the phase angle of the second periodic input signal is to be subtracted from the phase angle of the first periodic input signal. The signal represented as $\sin(\omega t + \phi_2)$ is fed as the first periodic input of the function multipliers 10c and 10d and as the second periodic input of the function multipliers 10a and 10b, while the signal represented as $\sin(\omega t + \phi_2 + \phi_3)$ is fed as the first periodic input to the function multiplier 10a, and the same signal phase displaced by $(-\pi)/(2)$ radians and represented as $\sin(\omega t + \phi_2 + \phi_3 - (\pi)/(2))$ is fed as the first periodic input to the function multiplier 10b. In a similar manner, the signal represented as $\sin(\omega t + \phi_2 - \phi_3)$ is fed as the second periodic input to the function multiplier 10c, and the signal displaced $(\pi)/(2)$ radians and represented as $\sin(\omega t + \phi_2 - \phi_3 - (\pi)/(2))$ is fed as the second periodic input to the function multiplier 10d.

Each voltage phase function multiplier circuit multiplies the output signal $e_1$ it receives from the range modulator 202 by a function of the phase of the first periodic input signal it receives as just explained minus the phase of the second periodic input signal it receives to produce outputs respectively equal to $e_1 \cos \phi_3$, $e_1 \sin \phi_3$, $e_1 \cos \phi_3$, and $e_1 \sin \phi_3$. The device is oriented preferably so that $\phi_3$ equals the desired azimuth angle and assuming this condition then when the output signals from the function multipliers 10a and 10c are combined in a summing circuit 208, an output is produced which can be expressed as $e_1 \cos \phi_3$. In like manner, the outputs of the function multipliers 10b and 10d are combined in another summing circuit 210 to produce an output signal which can be expressed as $e_1 \sin \phi_3$. After suitable amplification and/or storage these outputs signals are applied to the vertical and horizontal deflection plates of a cathode-ray tube (CRT) 212 to produce the desired visible display.

The device 200 as shown in FIG. 4 is used to generate outputs for application to the deflection plates of a CRT so the range and bearing of an object from an antenna such as disclosed in the Venters et al. application can be displayed more accurately than heretofore has been possible. The Venters et al. antenna system produces three periodic signals as aforesaid, but only two of them need be used by a double-output function multiplier 100 as shown in FIGS. 2 and 3 of the present construction to produce range and bearing information about the object. The device 200 while being more complex than the device 100 contains four single-output function multipliers of the type shown in FIG. 1 or two double-output function multipliers of the type shown in FIG. 3, and it uses all three of the available periodic input signals. When the antenna signals contain erroneous components such as those due to ground reflections and other interference, the device 200 generates outputs which contain about 50 percent less bearing error than those generated by the double output function multiplier 100.

This reduction in bearing error is shown in the following error analysis comparison between the devices 200 and 100.

The available input signals from the Venters et al. antenna including erroneous components can be expressed as:

$\sin \omega t + k \sin (\omega t + \alpha)$
$\sin (\omega t + \phi_0) + k \sin (\omega t + \alpha + \phi_0 + \Delta \phi)$
$\sin (\omega t - \phi_0) + k \sin (\omega t + \Delta - \phi_0 - \Delta \phi)$ where:

$\phi_0$ is the true bearing from the antenna to the object, $\Delta \phi$ is the difference between the angles of incidence of the erroneous signal and the true bearing signal, $\alpha$ is the relative radiofrequency phase angle of the erroneous signal, and, $k$ is the relative amplitude of the erroneous signal with respect to the true signal.

For small levels of erroneous signals or interference at least 20db. down from the true signal, which small level is usually obtainable if the antenna is properly located, but is here assumed only for purpose of analysis and does not limit the invention, the three input signals from the antenna are very nearly equal to:

$\sin (\omega t + k \sin \alpha)$
$\sin \{\omega t + \phi_0 + k \sin (\alpha + \Delta \phi)\}$
$\sin \{\omega t - \phi_0 + k \sin (\alpha - \Delta \phi)\}$ when the amplitude error factor is omitted for simplicity.

For the device 100 which uses only two of these signals the generated vertical output signal to the CRT is:

$\sin \{\phi_0 + k \sin (\alpha + \Delta \phi) - k \sin \Delta\}$ and the generated horizontal output signal is:

$\cos \{\phi_0 + k \sin (\alpha + \Delta \phi) - k \sin \alpha\}$

The bearing angle of the object which is the direction from the antenna to the object as displayed on the CRT will therefore be:

$\phi_0 + k \{\sin (\alpha + \Delta \phi) - \sin \alpha\}$

Since $\phi_0$ is the true bearing angle which should be displayed, it can therefore be seen that for small signal approximation, the maximum possible error from the true bearing for the device 100 is $\approx 2k$ radians and the worst scatter, $\pm 2k$ radians occurs when $\Delta \phi = 180°$ (back scatter). The rms bearing error equals $k\sqrt{2}$ radians.

The r.m.s. bearing error of the device 200, on the other hand, is $$k \frac{\sqrt{2}}{2}$$

radians as will be explained. For the device 200, all three available periodic input signals from the antenna are utilized and the generated vertical output signal to the CRT can be expressed as:

$\sin \{\phi_0 + k \sin(\alpha + \Delta \phi) - k \sin \alpha\} + \sin \{\phi_0 - k \sin(\alpha - \Delta \phi) + k \sin \alpha\}$ and the horizontal output signal can be expressed as:

$\cos \{\phi_0 + k \sin(\alpha + \Delta \phi) - k \sin \alpha\} + \cos \{\phi_0 - k \sin(\alpha - \Delta \phi) + k \sin \Delta\}$ The bearing angle of the object displayed on the CRT is therefore:

$$\tan^{-1} \frac{\sin \{\phi_0 + k \sin (\alpha + \Delta \phi) - k \sin \alpha\} + \sin \{\phi_0 - k \sin (\alpha - \Delta \phi) + k \sin \alpha\}}{\cos \{\phi_0 + k \sin (\alpha + \Delta \phi) - k \sin \alpha\} + \cos \{\phi_0 - k \sin (\alpha - \Delta \phi) + k \sin \alpha\}}$$

which approximately reduces to $\phi_0 + k \sin \Delta \phi \cos \alpha$.

The maximum possible error from the true bearing angle $\phi_0$ is therefore $\approx k$ radians and the worst possible scatter, $\pm k$ radian occurs when $\Delta \phi = 90°$. When $\Delta \phi = 180°$ there is zero error so back-scatter is eliminated while the r.m.s. error equals $$k \frac{\sqrt{2}}{2}$$

radians or one-half of the error of the device 100 as aforesaid. The device 200 does, however, introduce some small errors in the range of the displayed object but the errors are normally not large enough to be objectionable or in most cases even observable.

Thus there has been shown and described novel voltage phase function multiplier means for combining the alterations, of one signal with the phase difference between two other signals and novel applications of such means which fulfill all of the objects and advantages sought therefor. Many changes, alterations, modifications and other uses and applications of the subject means, however, will become apparent to those skilled in the art after considering this specification which discloses several preferred embodiments thereof. All such changes, alterations, modifications and other uses and applications of the subject means which do not depart from the spirit and scope of the invention are deemed to be covered by the invention which is limited only by the claims which follow.

I claim:

1. Computer means for generating an output $e_1 \cos (\phi_3 - \phi_2)$ from inputs $e_1$, $E_2 \sin (\omega t + \phi_2)$ and $E_3 \sin (\omega t + \phi_3)$, where $e_1$, $E_2$ and $E_3$ are relatively constant, $\omega$ represents frequency, and $\phi_2$ and $\phi_3$ are phase angles, including amplitude modulator means having separate inputs to which the respective inputs $e_1$ and $E_3 \sin (\omega t + \phi_3)$ are fed, said modulator means including means for combining the inputs and producing an output which is a function of the $e_1$ input and portion $\sin (\omega t + \phi_3)$ of the input $E_3 \sin (\omega t + \phi_3)$, bipolar switch means having a first input connected to receive the output $e_1 \sin (\omega t + \phi_3)$ of said amplitude modulator means and a second input connected to receive the input $E_2 \sin (\omega t + \phi_2)$, the input signal at said second switch input controlling said switch means to produce a switch output which is a function of $e_1 \sin (\omega t + \phi_3)$ whenever $(\omega t + \phi_2)$ is in a range from zero to $\pi$ radians and is zero whenever $(\omega t + \phi_2)$ is in a range $\pi$ radians to $2\pi$ radians, and signal integrating means having an input connected to the output of said bipolar switch means for integrating said switch output to produce an output represented by the expression $e_1 \cos (\phi_3 - \phi_2)$.

2. The computer means defined in claim 1 wherein said amplitude modulator means include a limiter to which the input signals $e_1$ and $E_3 \sin (\omega t + \phi_3)$ are fed, said limiter generating an output which is substantially a square wave having an amplitude which is a function of $e_1$, a frequency $\omega$ and a phase angle $\phi_3$, said amplitude modulator means also including a filter circuit having an input thereto which is connected to receive the square wave output of the limiter, said filter circuit passing as the output thereof the fundamental sinusoidal signal of the square wave input which is a function of the combined input signal components $e_1 \sin(\omega t + \phi_3)$.

3. The computer means defined in claim 2 wherein said limiter includes means biasing it so its output is represented by $(e_1 + K) \sin(\omega t + \phi_3)$, where $K$ is a constant, said amplitude modulator means including inverting amplifier means to which the input $E_3 \sin(\omega t + \phi_3)$ is fed, said inverting amplifier producing an output represented as $-K \sin(\omega t + \phi_3)$, and signal combining means in the computer means having inputs connected respectively to receive the outputs of the inverting amplifier means and the filter circuit and to combine said outputs to produce an output signal which is a function of the combined input signal components $e_1 \sin(\omega t + \phi_3)$.

4. An electronic circuit for producing outputs represented by the expressions $e_1 \sin(\phi_3 - \phi_2)$ and $e_1 \cos(\phi_3 - \phi_2)$ from input signals represented by the expressions $e_1$, $E_2 \sin(\omega t + \phi_2)$, $E_3 \sin(\omega t + \phi_3)$ and $E_3 \sin(\omega t + \phi_3 + 90°)$, where $e_1$, $E_2$ and $E_3$ are relatively constant quantities, $\omega$ represents frequency and $\phi_2$ and $\phi_3$ are phase angles, comprising similar first and second amplitude modulators and phase detector means, said first amplitude modulator including a first limiter having inputs connected to receive the input signals $e_1$ and $E_3 \sin(\omega t + \phi_3)$, said second amplitude modulator including a second limiter having inputs connected to receive the input signals $e_1$ and $E_3 \sin(\omega t + \phi_3 + 90°)$, said first and second limiters producing outputs which are square waves having amplitudes which are functions of $e_1$ and frequencies and phase angles represented as $(\omega t + \phi_3)$ and $(\omega t + \phi_3 + 90°)$ respectively, said first and second amplitude modulators also including first and second filter circuits respectively each of which has an input connected respectively to the output of the associated first and second limiters, said filters passing outputs represented as the fundamental frequency sinusoidal signals $e_1 \sin(\omega t + \phi_3)$ and $e_1 \cos(\omega t + \phi_3)$, said phase detector means including signal limiter and pulse forming means, first and second switch means and first and second integrator means, said limiter and pulse forming means being connected to receive input signal $E_2 \sin(\omega t + \phi_2)$ and forming output pulses therefrom, said first switch means being connected to receive the output of said first amplitude modulator represented as $e_1 \sin(\omega t + \phi_3)$ and to receive the output pulses of said limiter and pulse forming means, said second switch means being connected to receive the output of said second amplitude modulator represented as $e_1 \cos(\omega t + \phi_3)$ and to receive the output pulses of said limiter and pulse forming means, the output pulses from the limiter and pulse forming means controlling the operation of said first and second switch means to cause said switch means to alternately pass and block the amplitude modulator output signals, said passed signals from said first switch means being fed to the first integrator means and said passed signals from said second switch means being fed to the second integrator means, said first and second integrators respectively producing outputs which can be represented as $e_1 \cos(\phi_3 - \phi_2)$ and $e_1 \sin(\phi_3 - \phi_2)$.

5. The circuit defined in claim 4 wherein said first limiter is biased so its output can be represented as $(e_1 + k_1) \sin(\omega t + \phi_3)$ wherein $K_1$ is a constant, said first amplitude modulator including signal inverting means having an input connected to receive the input signal represented by $E_3 \sin(\omega t + \phi_3)$ and to produce therefrom an output signal represented by $-K_1 \sin(\omega t + \phi_3)$, and means connecting the output of the inverting means to the output of the first filter to combine said outputs therefrom to produce an output signal represented as $e_1 \sin(\omega t + \phi_3)$.

6. The circuit defined in claim 4 wherein said second limiter is biased so its output can be represented as $(e_1 + K_2) \sin(\omega t + \phi_3 + 90°)$ where $K_2$ is constant, said second amplitude modulator including signal inverting means having an input connected to receive the input signal represented by $E_3 \sin(\omega t + \phi_3 + 90°)$, and to produce therefrom an output signal represented by $-K_2 \sin(\omega t + \phi_3 + 90°)$, and means connecting the output of the said last-named inverting means to the output of the second filter to combine said outputs therefrom to produce an output signal represented as $e_1 \sin(\omega t + \phi_3 + 90°)$.

7. Means for combining a first signal whose amplitude is proportional multipliers the connected to receive said second signal, said third signal being connected to the object from a site with second, third, and fourth signals which may contain objectionable signal components capable of introducing error, said second, third and fourth signals having phase differences which depend on the azimuth of the object from the site, said combining means producing outputs which minimize the effects of said objectionable input signal components for use in applying to means for displaying the relationship of the object from the site, said combining means including four voltage phase function multipliers each of which has first, second and third inputs and an output, and first and second 90° phase shifters each having an input and an output, each of said multipliers producing at the output thereof a signal which is a function of the signal fed to its first input times the cosine of the phase angle of the signal fed to its second input further modified by the phase angle of the signal fed to its third input, said first inputs of each of the four multipliers being connected to receive said first signal, said second inputs of said third and fourth multipliers and said third inputs of said first and second multipliers being connected to receive said second signal, said third signal being connected to the second input of said first multiplier and to the input of the first phase shifter whose output is connected to the second input of said second multiplier, said fourth signal being connected to the third input of said third multiplier and to the input of the second phase shifter whose output is connected to the third input of said fourth multiplier, first and second signal summers each having input and output connections, the outputs of said first and third multipliers being connected to the input connections of the first summer, the outputs of said second and fourth multipliers being connected to the input connections of the second summer, said first and second summers producing output signals which are respectively said first signal times the cosine of the phase angle between said second and said third signals and said first signal times the sine of the phase angles between said second and said third signals.

8. An electronic circuit for multiplying the amplitude of a first signal times a function of the phase difference between a second and a third signal comprising an amplitude modulator and a phase detector, said amplitude modulator having first and second inputs to which the first and third signals respectively are fed, said amplitude modulator including means for modulating the third signal with the amplitude of the first signal to produce an output which can be represented as a signal which is a function of the magnitude of the first signal and the phase and frequency of the third signal, said phase detector having first and second inputs to which the output signal of the amplitude modulator and the said second signal respectively are fed, said phase detector including filter means and bipolar switch means, said switch means having open and closed operating conditions which are under control of said second signal so that said switch means 90 to a closed condition to pass the output of the amplitude modulator under predetermined conditions of said second signal so that selected portions only of said amplitude modulator output signals are passed to said filter means, said filter means including means for integrating the received selected portions of the output of the amplitude modulator passed thereto by said switch means to produce therefrom an output which is a function of the magnitude of the first signal times a function of the phase difference between said second and third signals.

9. Means for generating output signals for a device to visually display the location of a remote object relative to a known location from four input signals, the first of which input signals varies in proportion to the range of the object from the known location, the second, third, and fourth of said input signals being time varying signals having relative phase relationships which depend on the azimuth of the remote object relative to the known location comprising four similar voltage phase function multiplier circuits each having three input connections and an output connection, means for feeding the first input signal to one of the input connections of each of said voltage phase function multiplier circuits, means for feeding the second input signal to another input connection of each of said voltage phase function multiplier circuits, means for feeding the third input signal to the remaining input connections of said one of said voltage phase function multiplier circuits, means for shifting the phase of the third input signal by $\pi/2$ radians and feeding the phase shifted third signal to the remaining input connection of another one of said voltage phase function multiplier circuits, means for feeding the fourth input signal to the remaining input connection on still another of said voltage phase function multiplier circuits, means for shifting the phase of the fourth input signal by $\pi/2$ radians and feeding the phase shifted fourth signal to the remaining input connection of the one remaining voltage phase function multiplier circuit, each of said four voltage phase function multiplier circuits including means for producing an output signal which depends on the characteristics of the inputs fed thereto, and means including signal summing circuits for combining the respective outputs of selected pairs of said voltage phase function multiplier circuits to produce output signals which are functions of the magnitude of the first input signal times a sine and a cosine function respectively of a phase relationship associated with the said second, third and fourth signals for applying an input to the visual display device.

10. The means defined in claim 9 wherein the second, third, and fourth input signals have a predetermined phase relationship wherein the magnitude of the phase angle between the second and third signals is approximately equal to the magnitude of the phase angle between the second and the fourth signals.

11. Computer means for generating an output $e_1 \cos(\phi_3 - \phi_2)$ from inputs $e_1$, $E_2 \sin(\omega t + \phi_2)$, and $E_3 \sin(\omega t + \phi_3)$, where $e_1$, $E_2$ and $E_3$ are relatively constant, $\omega$ represents frequency, and $\phi_2$ and $\phi_3$ are phase angles, including amplitude modulator means to which the inputs $e_1$ and $E_3 \sin(\omega t + \phi_3)$ are fed, said modulator means producing an output which is a function of $e_1 \sin(\omega t + \phi_3)$, switch means having a first input connected to receive the output of said amplitude modulator means and a second input connected to receive the input $E_2 \sin(\omega t + \phi_2)$, the signal at said second input controlling said switch means to produce an output therefrom which is a function of $e_1 \sin(\omega t + \phi_3)$ whenever $(\omega t + \phi_2)$ is in a range from zero to $\pi$ radians and is zero whenever $(\omega t + \phi_2)$ is in a range from $\pi$ radians to $2\pi$ radians, and means having an input connected to the output of said switch means for integrating said switch output to produce an output represented by expression $e_1 \cos(\phi_3 - \phi_2)$, said switch means including a limiter circuit to which the input $E_2 \sin(\omega t + \phi_2)$ is fed, pulse forming means having an input connected to the output of said limiter circuit, said pulse forming means producing a pulsed output of frequency $\omega$ and phase angle $\phi_2$, and a bipolar switch having input means connected to receive the outputs of the pulse forming means and of the amplitude modulator means, said bipolar switch producing from the inputs received thereby an output which forms the input to the integrating means.

12. The computer means defined in claim 11 wherein said limiter circuit produces a square wave output of frequency $\omega$ and phase angle $\phi_2$ for feeding to said pulse forming means, said pulse forming means including a transformer having a primary winding connected to receive the square wave output of said limiter circuit and at least one secondary winding connected to the input means of said bipolar switch.

* * * * *

UNITED STATES PATENT OFFICE
CERTIFICATE OF CORRECTION

Patent No. 3,634,673  Dated January 11, 1972

Inventor(s) John R. Grindon

It is certified that error appears in the above-identified patent and that said Letters Patent are hereby corrected as shown below:

Column 6, line 45, "$\sin(\omega t + 2)$" should be "$\sin(\omega t + \phi_2)$" line 49, "$\sin(\omega t + \phi_2 \phi_3)$" should be "$\sin(\omega t + \phi_2 + \phi_3)$"; line 54, "$\sin(\omega t + 2 + \phi_3 - (\pi)/(2)$" should be "$\sin(\omega t + \phi_2 + \phi_3 - (\pi)/(2)$".

Column 7, line 2, cancel "3" and insert "same"; line 3, "$\sin(\omega t + 2 - \phi_3 - (\pi)/(2)$" should be "$\sin(\omega t + \phi_2 - \phi_3 + (\pi)/(2)$" line 47, "$\sin(\omega t - \phi_0) + k \sin(\omega t + \Delta - \phi_0 - \Delta\phi)$"should be "$\sin(\omega t - \phi_0) + k \sin(\omega t + \alpha - \phi_0 - \Delta\phi)$"; line 68, "$\sin\{\phi_0 + k \sin(\alpha + \Delta\phi) - k \sin \Delta\}$" should be "$\sin\{\phi_0 + k \sin(\alpha + \Delta\phi) - k \sin \alpha\}$".

Column 8, line 19, "$k \sin \Delta\}$" should be "$k \sin \alpha\}$"; line 39, "alterations" should be "amplitude".

Column 10, line 9, after "proportional" insert "to the range of an"; same line, cancel "multipliers the connected to receive said second"; line 10, cancel "signal, said third signal being connected to the"; line 61, "90" should be "go".

Signed and sealed this 27th day of June 1972.

(SEAL)
Attest:

EDWARD M. FLETCHER, JR.  ROBERT GOTTSCHALK
Attesting Officer  Commissioner of Patents